United States Patent [19]

Ellett et al.

[11] Patent Number: 5,556,062
[45] Date of Patent: Sep. 17, 1996

[54] PADDING AND CHOCKING APPARATUS FOR PIPE JOINTS AND/OR PIPE SECTIONS

[76] Inventors: William A. Ellett, 6010 River Road Cir., Shreveport, La. 71105; James D. Blalock, P.O. Box 1814, Baytown, Tex. 77522

[21] Appl. No.: 323,046

[22] Filed: Oct. 14, 1994

[51] Int. Cl.$^6$ .................................................. F16L 3/16
[52] U.S. Cl. ................................................ 248/55; 248/49
[58] Field of Search .............................. 248/49, 55, 346, 248/105; 410/49

[56] References Cited

U.S. PATENT DOCUMENTS

| | | | |
|---|---|---|---|
| 2,917,180 | 12/1959 | Snyder | 211/49 |
| 3,735,973 | 5/1973 | Petrie | 248/55 |
| 4,503,978 | 3/1985 | Smit et al. | 211/13 |
| 4,735,320 | 4/1988 | Hoss | 206/583 |
| 5,123,547 | 6/1992 | Koch | 211/59.4 |
| 5,168,642 | 12/1992 | Hansen | 34/234 |
| 5,335,887 | 8/1994 | Torrens et al. | 248/49 |

FOREIGN PATENT DOCUMENTS 447539  5/1975  Russian Federation ................. 248/55

Primary Examiner—Karen J. Chotkowski
Assistant Examiner—Gwendolyn Wrenn-Baxter
Attorney, Agent, or Firm—Browning, Bushman, Anderson & Brookhart

[57] ABSTRACT

A pipe support apparatus including a length of flexible webbing having a first receptacle formed at one end and a second receptacle formed adjacent an opposite end of the webbing, a first rigid member received within the first receptacle, and a second rigid member received within the second receptacle. Each of the first and second rigid members has a height greater than a thickness of the webbing. The length of webbing defines a pipe receiving surface between the first and second rigid members. Each of the first and second receptacles is a loop having an opening suitable for slidable receipt of the first and second rigid members. The first and second rigid members are cylindrical members which are slidably received within each of the receptacles. The webbing can have a plurality of receptacles formed adjacent one end of the webbing. The plurality of receptacles selectively receives one and only one of the rigid members.

20 Claims, 2 Drawing Sheets

PADDING AND CHOCKING APPARATUS FOR PIPE JOINTS AND/OR PIPE SECTIONS

RELATED APPLICATIONS

The present application is a refile of U.S. patent application Ser. No. 07/924,471, filed on Aug. 4, 1992, and entitled "DEVICE FOR PADDING AND CHOCKING PIPE/JOINT AND/OR PIPE SECTIONS", now abandoned.

TECHNICAL FIELD

The present invention relates to apparatus for padding and chocking pipes. More particularly, the present invention relates to apparatus for maintaining the stability of cylindrical members on a flat surface. Additionally, the present invention relates to padding devices for protecting the exterior of pipes from damage.

BACKGROUND ART

In the construction of pipelines, it is necessary to pad the pipe to protect the pipe coating from damage. This is achieved by using any type of material that is softer than the coating of the pipe itself. It is also necessary to chock the pipes to keep it from rolling off the skids or supports. Typically, this chocking is accomplished through the use of additional skids, rocks, skicks and other items. Anything is used that can be found when extra skids are not available. This conventional method is slow and dangerous for field personnel that have to handle such pipes and sections.

Typically, the prior art technique for padding and chocking the pipe is to use carpet, cloth, or rubber in small patches placed between both ends of a single pipe joint and the skids or supports. This method of the prior art has a high degree of physical handling of the skids and pipes. As a result of the large amount of physical handling, there is a great risk of injury to backs, hands, legs, and feet. In certain circumstances, death or debilitating injury has resulted from the handling of such pipe sections.

In the past, various patents have issued which relate to the present invention. For example, U.S. Pat. No. 2,917,180, issued on Dec. 15, 1959, to G. S. Snyder, describes a rack for cartons in which a panel is provided in which a divider is formed having a receptacle at one end for receiving a rod. The panel is a divider that is suitable for being slidably mounted in slots. The rod is designed so as to prevent complete withdrawal of the divider from the slot.

U.S. Pat. No. 4,503,978, issued on Mar. 12, 1985, to Smit et al., describes a support for cylindrical objects, such as rolled coils. This device employs a supporting member which is made of a resiliently deformable material, such as low density polyethylene. These supporting members are shaped so as to have a hill and valley profile that has a series of upwardly projecting ridges, sloping regions extending downwardly away from each side of the ridge, and substantially horizontal regions between the sloping regions.

U.S. Pat. No. 4,735,320, issued on Apr. 5, 1988, to D. A. Hoss teaches a shipping rack that includes one or more tiers of vertically spaced apart shelves which are fabricated of a pliable stretchable cloth. The vertical distance between each of the pair of vertically adjacent shelves is slightly greater than the thickness of the article of manufacture to be loaded thereon.

U.S. Pat. No. 5,123,547, issued on Jun. 23, 1992, to R. Koch describes equipment for storing and shipping pipes. In particular, this patent describes the use of pipe supports which each include a long, integrated molding having several cylindrical clearances present on two opposite sides, for several pipes. The molding is provided with a central duct extending between and transverse to the bilateral clearances and passing through the molding or the molded segments.

U.S. Pat. No. 5,168,642, issued on Dec. 8, 1992, to Elmer K. Hansen describes a tobacco drying apparatus including first and second substantially parallel support members and at least one friction lock assembly which is attached to the second support member. The friction lock assembly has a gate member which is pivotal about an axis that is substantially parallel to a longitudinal axis of the second support member. The gate member further has a leading edge which extends toward the first support member.

It is an object of the present invention to provide an apparatus that is effective for preventing damage to the coating of pipe sections.

It is another object of the present invention to provide an apparatus that securely locks the pipe sections so as to prevent the pipes from rolling off the skids.

It is another object of the present invention to provide an apparatus that is adaptable and adjustable to various sizes of pipes.

It is still another object of the present invention to provide an apparatus for supporting pipe that is easy to manufacture, easy to use, and relatively inexpensive.

These and other objects and advantages of the present invention will become apparent from a reading of the attached specification and appended claims.

SUMMARY OF THE INVENTION

The present invention is a pipe support apparatus that comprises a length of flexible webbing having a first receptacle formed at one end and a second receptacle formed adjacent an opposite end of the webbing, a first rigid member received within the first receptacle, and a second rigid member received within the second receptacle. Each of the first and second rigid members has a height greater than a thickness of the webbing. The length of webbing defines a pipe receiving surface between the first and second rigid members. Each of the receptacles is a loop having an opening for slidable receipt of the rigid members. The loop is of a circular configuration and has an inner diameter slightly greater than an outer diameter of one of the rigid members. The rigid members are of a cylindrical shape which is slidably received within the receptacles. In particular, each of the rigid members can be a completely solid cylindrical member having a length generally equal to a width of the webbing and a diameter at least ten times greater than the thickness of the webbing. The first and second rigid members have an identical configuration.

The present invention can also includes a first fastener which is affixed to the first rigid member, and to the first receptacle, so as to prevent the rigid member from sliding out of the receptacle. Additionally, a second fastener can be affixed to the second receptacle and to the second rigid member so as to prevent the second rigid member from sliding out of the second receptacle. In various embodiments, the fastener can be a plastic tie member which extends through a hole formed in the rigid member and around an exterior of the receptacle or it can be a threaded member which is threaddedly received by the exterior of the rigid member and extending through the receptacle material.

In the preferred embodiment of the present invention the webbing has a plurality of receptacles formed adjacent one end of the webbing. This plurality of receptacles are a series of loops which extend outwardly from the surface of the webbing. Each of these loops has an inner diameter suitable for receiving a rigid member therein. The rigid member is received within one and only one of the loops. As such, the rigid member can be positioned, as needed, to accommodate a particular size of pipe.

The webbing rests upon a pipe support skid. A pipe will rest upon the top surface of the webbing between each of the first and second rigid members.

As used herein, the term "pipe" can refer to pipe joints, pipe sections, or entire lengths of pipe.

DETAILED DESCRIPTION OF THE INVENTION

Figure 1:
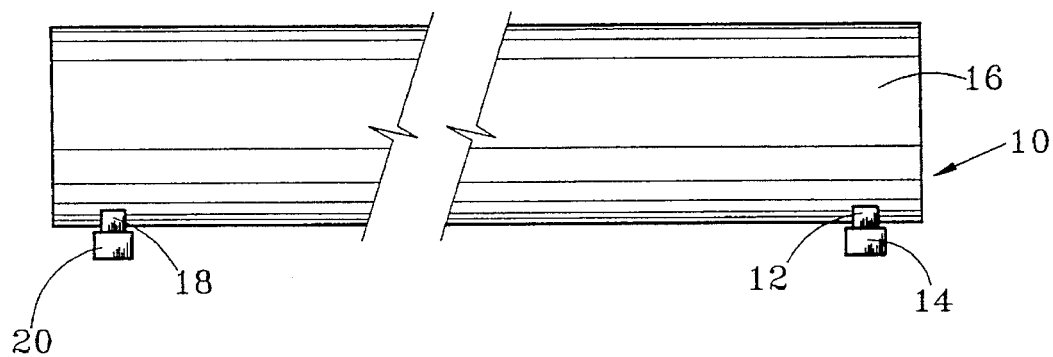
FIG. 1 is a side elevational view of a section of pipe as received on the pipe support apparatus of the present invention.

Referring to FIG. 1, there is shown at 10 the apparatus in accordance with the present invention. In particular, the present invention includes a pipe support apparatus 12 which rests upon a pipe support skid 14 for supporting a pipe 16 in a proper position. A second pipe support apparatus 18 is positioned at another location along the length of pipe 16 so as to receive the outer diameter of the pipe 16. The second pipe support apparatus 18 rests upon a second pipe support skid 20. In this arrangement, the combination of skids 14 and 20 with the pipe support apparatus 12 and 18 serves to retain the cylindrically-shaped pipe 16 in a proper position above the earth. Additionally, the configuration of the pipe support apparatus 12 and 18 prevents the pipe 16 from rolling or becoming dislodged off of the skids 14 and 20 and also serves to pad the coating of the pipe 16 from any damage caused by contact with the pipe support skids 14 and 20, or with other objects on the earth.

Figure 2:
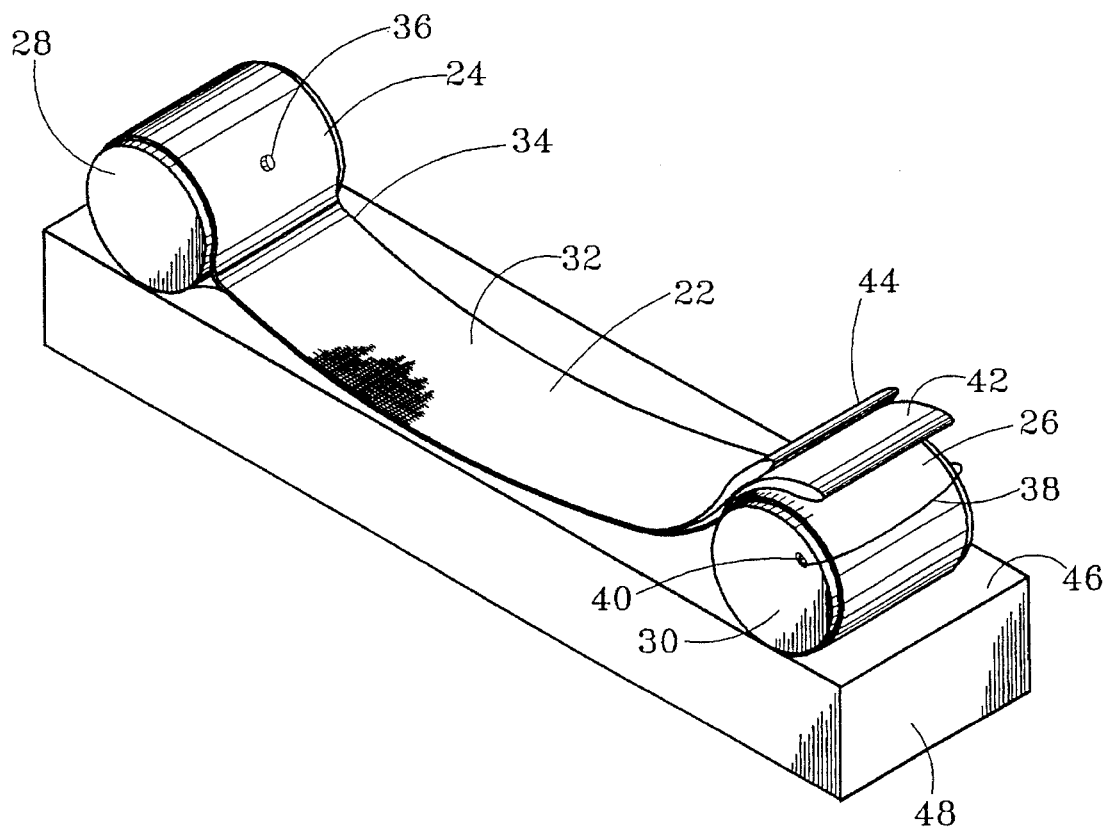
FIG. 2 is a perspective view showing the configuration of the pipe support apparatus of the present invention, as placed upon a pipe support skid.

FIG. 2 shows a detailed view of the pipe support apparatus 12 as employed in the present invention. The pipe support apparatus 12 includes a length 22 of flexible webbing. A first receptacle 24 is formed at one end of the length of webbing 22. A second receptacle 26 is formed adjacent to the opposite end of the length of webbing 22. A first rigid member 28 is received within the first receptacle 24. A second rigid member 30 is received within the second receptacle 26. As can be seen, each of the first rigid member 28 and the second rigid member 30 have a height greater than a thickness of the webbing 22. A central area 32 of the length of webbing 22 defines a pipe receiving surface 32 between the first rigid member 28 and the second rigid member 30.

The webbing 22 is made of a very strong fibrous material. Typically, the webbing 22 should be made of various man-made fibers such as, for example, acetate fibers, polyester fibers, spandex fibers, nylon fibers, acrylic fibers, modacrylic fibers, or polypropylene fibers. As such, the webbing 22 will exhibit flexibility and extreme wear resistance. Given the harsh environment in which such webbing 22 is placed, it is very important that the webbing 22 be made of strong and durable fibers. Various reinforcement layers of fiber can be placed upon the area 32 of the webbing 22 so as to enhance the strength properties of the webbing 22. In the preferred embodiment of the present invention, the webbing 22 is made of a nylon material.

The first receptacle 24 is a loop of webbing material which is formed at end 34 of the webbing 22. The receptacle 24 has a generally circular configuration. However, within the concept of the present invention, it is important to realize that various other shapes of the receptacle 24 can be employed in accordance with the purposes of the present invention. When a circular configuration of the receptacle 24 is employed, then the receptacle 24 is suitable for the receipt of a cylindrically-shaped rigid member 28. As such, the rigid member 28 can be slidably received within the interior of the receptacle 24. However, if the receptacle 24 would have a triangular configuration, then a triangular shaped rigid member 28 could be received therewithin. In any event, the inner diameter of the receptacle 24 should be slightly greater than the outer diameter of the rigid member 28 so as to allow the rigid member 28 to be slidably, and removably, received within the interior of the receptacle 24.

A second receptacle 26 is formed at adjacent an opposite end of the webbing 22. The receptacle 26 should have a similar configuration to that of the first receptacle 24. The second receptacle 26 serves to slidably receive the cylindrically-shaped rigid member 30 therewithin.

The rigid members 28 and 30 are solid cylindrical members having a length which is generally equal to the width of the webbing 22. In normal use, so as to prevent the rolling of the pipe, the rigid members 28 and 30 should have a diameter at least ten times greater than the thickness of the webbing 22. Each of the rigid members 28 and 30 is made of an ultra high molecular weight thermoplastic material. Such material is extremely strong, tough, and abrasion resistant. It also has high impact resistance, high mechanical strength, great resilience, and will have dimensional stability at high or low temperatures. As such, such a material can withstand the harsh environment to which the apparatus 14 of the present invention is placed.

In the present invention, it is desirable that the rigid members 28 and 30 be properly retained within the receptacles 24 and 26, respectively. As can be seen, a threaded member 36 is used so as to secure the first rigid member 28 within the receptacle 24. The threaded member 36 can be a screw which is inserted into the webbing of the receptacle 24 and threadedly received within the body of the rigid member 28. Alternatively, a plastic tie 38 can be employed so as to secure the rigid members within the receptacles. As can be seen in FIG. 2, a hole 40 is formed through the interior of the second rigid member 30. The plastic tie 38 will extend through the hole 40 and around the exterior surface of the second receptacle 26. This arrangement can effectively secure the rigid member 30 within the receptacle 26. Either the threaded technique or the plastic tie technique can be employed with either, or both, of the rigid members 28 and 30.

An important aspect of the present invention is the ability to adjust the size of the pipe support apparatus 12. So as to achieve this adjustability, additional receptacle areas are formed adjacent to the second receptacle 26. In particular, these receptacles include loops 42 and 44 which are positioned adjacent to the end of the webbing 22 and inwardly of the receptacle 26. Each of the loops 42 and 44 has a configuration similar to that of loop 26. The loops 42 and 44 are made of strong webbing material which is connected to the top surface of the webbing 22 so as to extend upwardly and outwardly therefrom. In the configuration illustrated in FIG. 2, the loops 42 and 44 will rest, in overlying relationship, with the exterior surface of the receptacle 26. However, when it is desirable to receive a pipe of smaller diameter upon the pipe receiving surface 32 of the webbing 22, then the second rigid member 30 can be removed from its position within receptacle 26 and inserted within either of the loops 42 or 44. When the apparatus 12 is employed in the manner shown in FIG. 2, the loops 42 and 44 will simply serve as additional padding for the exterior surface of the pipe.

In FIG. 2, it can be seen that the pipe support apparatus 12 rests upon the top surface 46 of a pipe support skid 48. The pipe support skid 48 has a length greater than the length of the pipe support apparatus 12 and has a width that is generally greater than the width of the webbing 22. The pipe support skid 48 will simply rest upon the earth, or another surface, when in use. At least one portion of the pipe support apparatus 12 will rest in contact with the top surface 46 of the pipe support skid 48.

Figure 3:
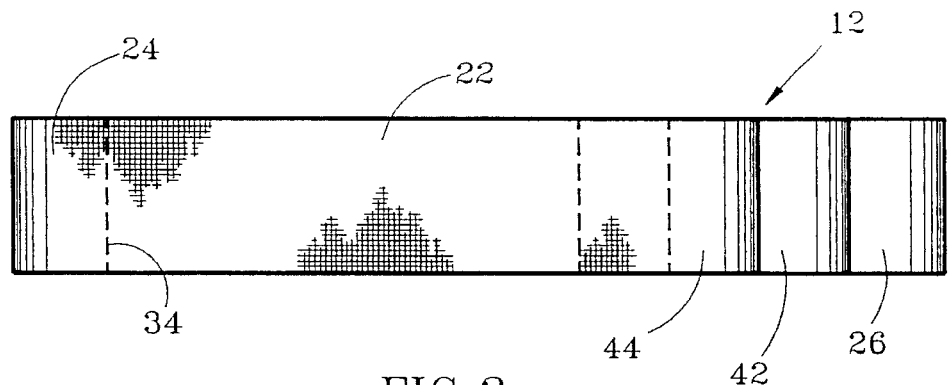
FIG. 3 is a plan view of the webbing and receptacles of the pipe support apparatus of the present invention.

FIG. 3 shows that the pipe support apparatus 12 of the present invention is a length of Webbing 22 having a loop or receptacle 24 formed at end 34. A second receptacle or loop 26 is formed at an end opposite the first receptacle 24. Additional loops 42 and 44 are formed adjacent to the receptacle 26. It can be seen that the webbing 22 has a generally rectangular configuration.

Figure 4:
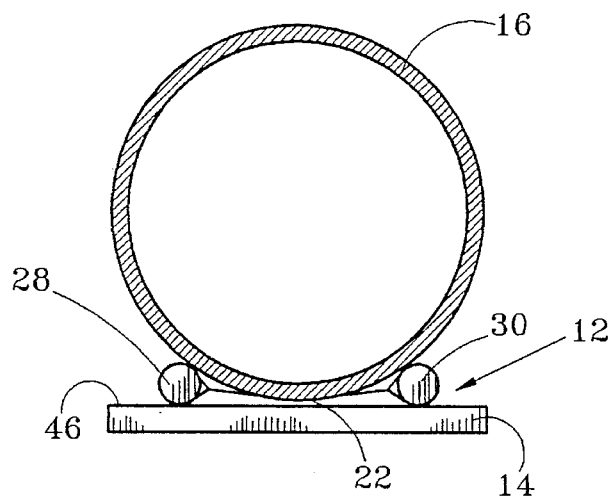
FIG. 4 is an end view of the present invention as used for the support of pipe upon a pipe skid.

FIG. 4 shows how the pipe 16 is supported upon the pipe support apparatus 12 on the pipe support skid 14. In particular, it can be seen that the rigid members 28 and 30 rest upon the top surface 46 of the skid 14. The outer diameter of the pipe 16 rests upon the top surface of the webbing 22. In this arrangement, the rigid members 28 and 30 will be placed in close proximity to the outer diameter of the pipe 16 so as to prevent the pipe 16 from rolling off of the skid 14. The webbing material forming the outer surface of the receptacles 24 and 26 will serve as padding around the rigid members 28 and 30. As such, the padding will prevent damage to the coating on the pipe 16.

Figure 5:
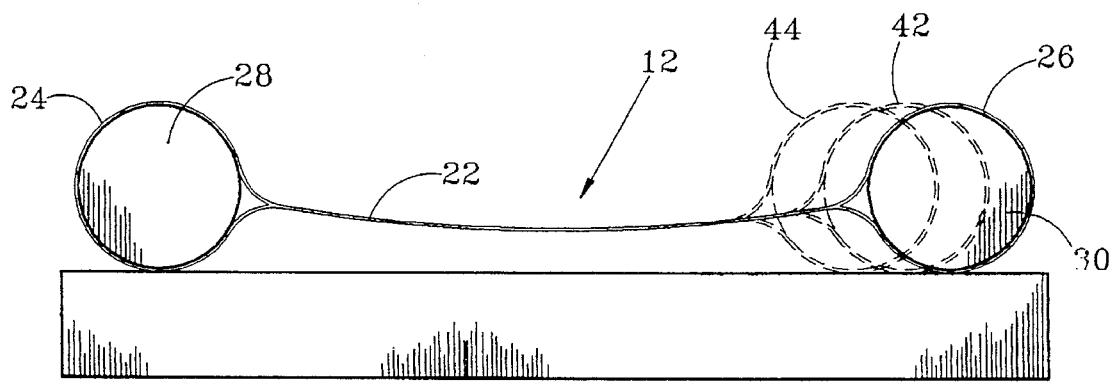
FIG. 5 is an isolated end view showing the configuration of the pipe support apparatus of the present invention as employed so as to be adjustable for accommodating various diameters of pipe.

FIG. 5 shows the arrangement of the pipe support apparatus 12 of the present invention. The size of the pipe support apparatus 10 can be adjusted, as needed, so as to accommodate various diameters of pipe. In FIG. 5, it can be seen that the insert member 30 can be placed within the loops 42 or 44 so as to reduce the distance between the rigid members 28 and 30 and to reduce the area of the pipe receiving surface of the webbing 22. The relative position of the rigid member 30 in the loops 42 and 44 is illustrated in broken line fashion in FIG. 5.

The present invention provides a pipe support apparatus that serves to protect the outer coating of pipe sections from damage that can occur from contact with the skids that support the pipe. The pipe support apparatus 12 of the present invention also serves to prevent the pipe section from rolling off of the skids that support the pipe. The pipe support apparatus 12 of the present invention eliminates the need to use additional skids to support the pipe on the skids. As such, the pipe support apparatus 12 will redistribute and minimize the number of skids used per pipe section. This serves to decrease physical handling of the pipe section and serves to increase the productivity of the workers.

The foregoing disclosure and description of the invention is illustrative and explanatory thereof. Various changes in the details of the illustrated configuration may be made within the scope of the appended claims without departing from the true spirit of the invention. The present invention should only be limited by the following claims and their legal equivalents.

I claim:

1. A pipe support apparatus comprising:

a length of flexible webbing having a first receptacle formed at one end of said length and a second receptacle formed adjacent an opposite end of said webbing;

a first rigid member received within said first receptacle;

a second rigid member received within said second receptacle; and a pipe support skid having a top surface in juxtaposition with a bottom surface of said webbing, wherein each of said first and second rigid members has a height greater than a thickness of said webbing, said length of webbing forms a pipe receiving surface between said first and second rigid members and said pipe receiving surface is a top surface of said webbing.

2. The apparatus of claim 1, each of said first and second receptacles being a loop having an opening suitable for slidable receipt of said first and second rigid members.

3. The apparatus of claim 2, said loop being of a circular configuration, said circular configuration having an inner diameter slightly greater than an outer diameter of one of said first and second rigid members.

4. The apparatus of claim 3, said first rigid member being a cylindrical member slidably received within said first receptacle.

5. The apparatus of claim 4, said first rigid member being a completely solid cylindrical member having a length generally equal to a width of said webbing and having a diameter at least ten times greater than the thickness of said webbing.

6. The apparatus of claim 5, said second rigid member having an identical configuration to said first rigid member.

7. The apparatus of claim 1, said webbing having a plurality of receptacles formed adjacent said opposite end of said webbing, said plurality of receptacles being loops extending outwardly from a surface of said webbing, each of said loops having an inner diameter suitable for receiving said second rigid member therein.

8. The apparatus of claim 7, said second rigid member being a cylindrical member, said cylindrical member removably received within one of said loops.

9. A pipe support apparatus comprising:

a length of flexible webbing having a first receptacle formed at one end of said length and a second receptacle formed adjacent an opposite end of said webbing;

first and second rigid members received, respectively, within said first and second receptacles, each of said first and second rigid members having a height greater than a thickness of said webbing, said length of webbing forming a pipe receiving surface between said first and second rigid members; and a first fastener means affixed to said first receptacle and to said first rigid member, said first fastener means for retaining said first rigid member within said first receptacle.

10. The apparatus of claim 9, further comprising:

a second fastener means affixed to said second receptacle and to said second rigid member, said second fastener means for retaining said second rigid member within said second receptacle.

11. The apparatus of claim 9, said first fastener means comprising:

a plastic tie member extending through a hole formed in said first rigid member and around an exterior of said first receptacle.

12. The apparatus of claim 9, said first fastener means comprising:

a threaded member threadedly received into a surface of said first rigid member, said threaded member extending through said first receptacle.

13. An apparatus comprising:

a pipe support skid having a generally flat top surface;

a length of flexible webbing positioned in contact with said top surface of said pipe support skid, said webbing having receptacles formed adjacent opposite ends of said length;

a pair of rigid members each having a height greater than a thickness of said webbing, each of said rigid members received within a receptacle of said webbing; and a pipe positioned on a top surface of said webbing between said rigid members, said length of webbing extending transverse to a longitudinal axis of said pipe.

14. The apparatus of claim 13, said webbing having a width less than a width of said pipe support skid and a length less than a length of said pipe support skid.

15. The apparatus of claim 13, said receptacles being loops, said rigid members being cylindrical members slidably received within said loops, each of said loops being adjacent an exterior surface of said pipe.

16. The apparatus of claim 13, at least one of said receptacles comprising:

a plurality of loops formed adjacent one end of said webbing, one and only one of said plurality of loops receiving one of said rigid members.

17. The apparatus of claim 16, at least one of said loops being compressed and interposed between an exterior surface of said pipe and an exterior of one of said loops.

18. The apparatus of claim 13, said pipe having a diameter greater than a height of said rigid members.

19. The apparatus of claim 13, each of said rigid members being a cylindrical member extending in the receptacle so as to have a longitudinal axis parallel to the longitudinal axis of the pipe.

20. The apparatus of claim 13, said pipe support skid positioned at a first position along the length of said pipe, the apparatus further comprising:

a second pipe support skid having a generally flat top surface;

a second length of flexible webbing positioned in contact with the top surface of the second pipe support skid, said second length of webbing having receptacles formed adjacent opposite ends of said second length; and a second pair of rigid members each having a height greater than a thickness of said second length of webbing, each of said second pair of rigid members received within the receptacles of said second length of webbing, said second pipe support skid positioned at a second position along the length of the pipe.

* * * * *